United States Patent Office 3,655,654
Patented Apr. 11, 1972

3,655,654
DIPHENYLETHYLENE DERIVATIVES
Shigeyoshi Kitamura, Toyonaka, Hajime Hirai, Minoo, Yositosi Okuno, Toyonaka, and Keimei Fujimoto, Kobe, Japan, assignors to Sumitomo Chemical Company, Ltd., Osaka, Japan
No Drawing. Filed Mar. 10, 1970, Ser. No. 18,349
Claims priority, application Japan, Mar. 28, 1969, 44/24,230; Apr. 10, 1969, 44/27,918
Int. Cl. C07d 13/10
U.S. Cl. 260—240 D       5 Claims

ABSTRACT OF THE DISCLOSURE 1,2-diphenylethylene derivatives represented by the formula,

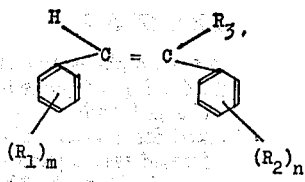

wherein $R_1$ and $R_2$ are respectively hydrogen, an alkyl, an alkoxy, methylenedioxy group bonded to two carbon atoms adjacent to each other on the benzene ring, or a halogen, $R_3$ is a group of —COOR or —CH$_2$OR in which R is propargyl or allyl, and $m$ and $n$ are an integer of 1 to 5, and when $m$ and/or $n$ are an integer of 2 or more, the $R_1$'s and/or $R_2$'s may be the same or different.

The 1,2-diphenylethylene derivatives may be useful as synergists.

---

This invention relates to novel diphenylethylene derivatives represented by the formula,

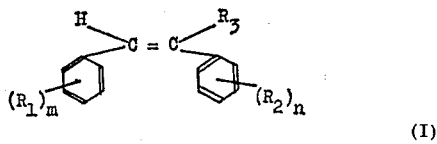

(I)

wherein $R_1$ and $R_2$ are respectively hydrogen, an alkyl, an alkoxy, methylenedioxy group bonded to two carbon atoms adjacent to each other on the benzene ring, or a halogen atom, $R_3$ is a group of —COOR or —CH$_2$OR in which R is propargyl or allyl, and $m$ and $n$ are an integer of 1 to 5, and when $m$ and/or $n$ are an integer of 2 or more, the $R_1$'s and/or the $R_2$'s may be the same or different, and to a method for producing said diphenylethylene derivatives. The present invention also relates to a composition containing at least one said derivative as active synergists.

In the present invention, the term "alkyl" and "alkoxy" mean a straight chain or branched chain alkyl and alkoxy having 1 to 4 carbon atoms.

According to the present invention, the 1,2-diphenylethylene derivatives of the Formula I may be produced by reacting a compound represented by the formula,

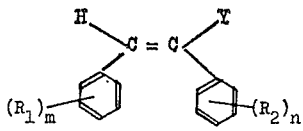

(II)

wherein $R_1$, $R_2$, $m$ and $n$ are as defined above; and Y is carboxyl, hydroxymethyl, an acyl halide, —COOR′ or —CH$_2$OR′ in which R′ is an alkyl; or an alkali metal salt or an acid anhydride thereof, with a compound represented by the formula, $$R_4 \cdot X \qquad (III)$$

wherein $R_4$ is propargyl or allyl and X is a halogen or hydroxyl.

The present process for producing the diphenylethylene (I) may be illustrated in detail as follows;

The first embodiment of the process is to obtain the diphenylethylene (I) by reacting the compound having carboxyl as Y in the Formula II, with the alcohol having the formula, $$R_4 \cdot OH$$

wherein $R_4$ is as defined above.

In this reaction, a dehydrating agent such as sulfuric acid, hydrochloric acid and p-toluene sulfonic acid may be preferably employed, and the reaction may be preferably conducted in a solvent.

The second embodiment of the process is to obtain the diphenylethylene (I) by reacting the compound having carboxyl as Y in the Formula II, with the halide having the formula, $$R_4 \cdot Hal$$

wherein $R_4$ is as defined above and Hal is a halogen.

This reaction may be preferably conducted in an inert solvent in the presence of basic condensing agents such as organic tertiary bases, hydroxides or carbonates of an alkali metal or an alkaline earth metal. In case where the organic tertiary base is employed as the condensing agent, said base may be reacted with said compound (II) or said halide in advance, but it is preferable to react the three reactants simultaneously.

In case where the hydroxides or carbonates are employed as the condensing agent, it is preferable to react said hydroxides or carbonate with the compound (II) in advance.

The third embodiment of the process is to obtain the diphenylethylene (I) by reacting the compound having an acyl halide as Y in the Formula II, with the alcohol having the formula, $$R_4 \cdot OH$$

wherein $R_4$ is as defined above.

This reaction may be preferably conducted in a solvent in the presence of a dehydrogenhalide agent such as organic tertiary base and carbonates of an alkali metal or an alkaline earth metal at relatively low temperature.

The forth embodiment of the process is to obtain the diphenylethylene (I) by reacting acid anhydrides of the compound (II) with the alcohol having the formula, $$R_6 \cdot OH$$

wherein $R_6$ is as defined above.

This reaction may be preferably conducted in an inert solvent under heating.

The fifth embodiment of the process is to obtain the diphenylethylene (I) by reacting the compound having an alkoxycarbonyl as Y in the Formula II, with the alcohol having the formula, $$R_4 \cdot OH$$

wherein $R_4$ is as defined above.

This reaction may be preferably conducted in the presence of a catalyst for esterification and in the presence of a sodium alcoholate.

The sixth embodiment of the process is to obtain the diphenylethylene (I) by reacting the compound having hydroxyl or hydroxymethyl as Y in the Formula II, with the halide having the formula, $$R_4 \cdot Hal$$

wherein Hal is a halogen and $R_4$ is as defined above.

This reaction may be preferably conducted in an inert solvent at room temperature or higher.

The seventh embodiment of the process is to obtain the diphenylmethane (I) by reacting the compound having hydroxyl or hydroxymethyl as Y in the Formula II, with the alcohol having the formula, $$R_4 \cdot OH$$

wherein $R_4$ is as defined above.

This reaction may be preferably conducted in the presence of a catalyst such as sulfuric acid and p-toluenesulfonic acid.

The present compounds themselves are low in insecticidal activity, but when one or more of cyclopropanecarboxylate type insecticides and carbamate type insecticides are incorporated with the present compounds, the insecticidal effects of said insecticides are greatly increased. Moreover, the present compounds are not only relatively inexpensive but also low in toxicity to mammals so that insecticides incorporated with the present compounds are advantageously increased in safeness to mammals.

The amounts of the present compounds to be used vary according to the extent of increase in insecticidal effect and to the costs of insecticides to which the present compounds are added. The most advantageous amounts should be decided in consideration of the purpose of application and the kind of insecticides.

Usually, the present compounds may be used in an amount of 0.5 to 50 times the weight of said insecticides.

Among the compounds represented by the aforesaid Formula I, those which are particularly useful for the object of the present invention are the compounds shown below, but it is needless to say that compounds of the present invention are not limited only to these.

The present invention is illustrated in further detail below with reference to examples, but it is needless to say that the scope of the invention is not limited by the examples.

EXAMPLE 1

To a mixture comprising 20 cc. of anhydrous dimethylformamide and 1.1 g. of 68% sodium hydride-paraffin was added with stirring at room temperature a solution of 5.3 g. of 2,3-diphenylallyl alcohol in 15 cc. of anhydrous dimethylformamide. After 1 hour, 3.6 g. of propargyl bromide was added at about 10° C., and the mixture was heated with stirring at about 60° C. for 1 hour. After cooling, the reaction mixture was charged into 100 cc. of water and was extracted 3 times with 50 cc. of ether, and the ether extract was dried over anhydrous magnesium sulfate. Subsequently, the ether was distilled off and then the paraffin was removed, whereby 3.9 g. of 2,3-diphenyl-2-propenylpropargyl ether was obtained. This product was purified according to alumina column chromatography to obtain an oily substance, $n_D^{25}$ 1.5958.

*Elementary analysis.*—Calculated (percent): C, 87.10; H, 6.45 (for $C_{18}H_{16}O$). Found (percent): C, 87.31; H, 6.58.

EXAMPLE 2

To a solution of 3.4 g. of α-phenylcinnamic acid in 30 cc. of acetone was added 2.8 g. of potassium carbonate, and the mixture was charged with 2.6 g. of propargyl bromide and was refluxed for 1 hour. After cooling the mixture, a precipitate formed was separated by filtration and then the acetone was distilled off. The residue was dissolved in ether and was washed with water. The ether solution was dried over anhydrous magnesium sulfate, and then the ether was removed by distillation to obtain 3.7 g. of propargyl α-phenylcinnamate.

Recrystallization from ethanol gave crystals having a melting point of 84–85° C.

| Compound No. | | |
|---|---|---|
| (1) | 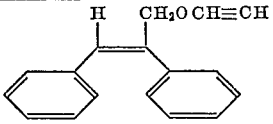 2,3-diphenyl-2-propenylpropargyl ether | $n_D^{25}$ 1.5958. |
| (2) | 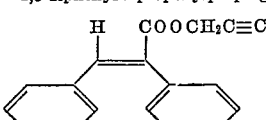 Propargyl α-phenylcinnamate | M.P. 84°–85° C. |
| (3) | 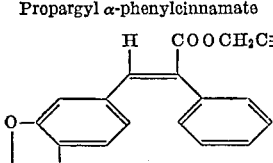 Propargyl α-phenyl-β-(3,4-methylenedioxyphenyl)acrylate | M.P. 112°–113° C. |
| (4) | 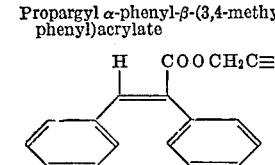 Propargyl α-phenyl-β-(4-methyoxyphenyl)acrylate | $n_D^{25}$ 1.5239. |

*Elementary analysis.*—Calculated (percent): C, 82.44; H, 5.34 (for $C_{18}H_{14}O_2$). Found (percent): C, 82.27; H, 5.39.

EXAMPLE 3

To a solution of 4.3 g. of α-phenyl-β-(3,4-methylenedioxyphenyl) acrylic acid and 2.0 g. of triethylamine in 30 cc. of dimethylformamide was added 2.6 g. of propargyl bromide, and the mixture was heated with stirring at about 60° C. for 1 hour. After cooling, the reaction mixture was poured into 100 cc. of water and was extracted 3 times with 50 cc. of ether, and ether extract was dried over anhydrous magnesium sulfate, and the ether was removed by distillation to obtain 4.3 g. of propargyl α-phenyl-β-(3,4-methylenedioxyphenyl) acrylate.

Recrystallization from ethanol gave crystals having a melting point of 112–113° C.

*Elementary analysis.*—Calculated (percent): C, 74.51; H, 4.58 (for $C_{19}H_{14}O_4$). Found (percent): C, 74.56; H, 4.51.

EXAMPLE 4

To a solution of 5.1 g. of α-phenyl-β-(4-methoxyphenyl) acrylic acid and 2.5 g. of triethylamine in 30 cc. of dimethylformamide was added 3.2 g. of propargyl bromide, and the mixture was reacted in the same manner as in Example 3 to obtain 5.3 g. of propargyl α-phenyl-β-(4-methoxyphenyl) acrylate.

Purification according to alumina column chromatography gave an oily substance, $n_D^{25}$ 1.5239.

*Elementary analysis.*—Calculated (percent): C, 78.08; H, 5.48 (for $C_{19}H_{16}O_2$). Found (percent): C, 78.16; H, 5.36.

It has hitherto been known that sesamin and related compounds contained in the sesame oil have enhancing action on the potency of an insecticide of the pyrethroid type. These compounds have little insecticidal activity when used alone, but it has been recognized that they can markedly enhance the effectiveness of an insecticide of the pyrethroid type when admixed with the latter in a suitable proportion. This enhancing action is generally called a synergetic effect, and the agent which exerts said effect is called a synergist.

As the synergist for pyrethrins, there are now widely used α-[2-(2-butoxyethoxy)ethoxy] - 4,5-methylenedioxy-2-propyltoluene (hereinafter referred to as piperonyl butoxide), 4 - (3,4-methylenedioxy-phenyl)-5-methyl-1,3-dioxane (hereinafter referred to as safroxane), etc. There are other kinds of synergist on the market including N-(2-ethylhexyl)-bicyclo[2,2,1]-hept - 5 - ene-anhydrophthalic acid-2,3-dicarboxyimide (trade name: MGK–264, McLaughlin Gormley King Co.), etc.

The aforesaid diphenylethylene derivatives invented by the present inventors have prominent synergistic effects not only on natural pyrethrin and allethrin but also on the insecticides previously invented by the present inventors and other various cyclopropanecarboxylate type insecticides, and are synergists which are more excellent than MGK–264 in effects on said insecticides and which have effects comparable to those of piperonyl butoxide. Moreover, the present compounds show a remarkable synergetic effect upon an insecticide of the carbamate type such as 1-naphthyl N-methylcarbamate (hereinafter referred to as carbaryl), as is the case usually with other known synergists for insecticides of the pyrethroid type, for example, piperonyl butoxide.

In order to further clarify the above-mentioned facts, a fundamental experiment is shown below. In the experiment, the numerals in the parentheses indicate the numbers of the present compounds exemplified previously.

Experiment

Each of natural pyrethrin, allethrin, N-(chrysanthemoxymethyl)-3,4,5,6 - tetrahydrophthalimide (hereinafter referred to as "Phthalthrin") and Carbaryl, either as it was or after addition of 5 times the amount (weight) of the insecticide of each of MGK–264, piperonyl butoxide and the present compounds (1), (2), (3) and (4), was adjusted to a test concentration by means of acetone to prepare samples. Each sample was tested in insecticidal effect according to such a method that a slight amount of the sample was dropped by means of a micro syringe onto the corselet tergum of a housefly adult. The 50% lethal doses ($LD_{50}$) of the individual samples after 24 hours were as shown in the following table:

| Insecticide | Synergist | $LD_{50}$ (γ/fly) | Degree of increase in insecticidal effect |
|---|---|---|---|
| Phthalthrin | | 0.56 | 1.0 |
| Do | MGK–264 | 0.36 | 1.6 |
| Do | Piperonyl butoxide | 0.14 | 4.0 |
| Do | Present compound (1) | 0.105 | 5.3 |
| Do | Present compound (2) | 0.11 | 5.1 |
| Do | Present compound (3) | 0.11 | 5.1 |
| Do | Present compound (4) | 0.13 | 4.3 |
| Natural pyrethrin | | 0.40 | 1.0 |
| Do | MGK–264 | 0.34 | 1.2 |
| Do | Piperonyl butoxide | 0.08 | 5.0 |
| Do | Present compound (1) | 0.075 | 5.3 |
| Do | Present compound (3) | 0.07 | 5.7 |
| Allethrin | | 0.62 | 1.0 |
| Do | MGK–264 | 0.35 | 1.8 |
| Do | Present compound (2) | 0.20 | 3.1 |
| Do | Present compound (4) | 0.25 | 2.5 |
| Carbaryl | | (¹) | 1.0 |
| Do | Present compound (1) | 0.28 | (²) |
| Do | Present compound (4) | 0.30 | (³) |
| | Present compound (1) | (¹) | |
| | Present compound (2) | (¹) | |
| | Present compound (3) | (¹) | |
| | Present compound (4) | (¹) | |

¹ More than 5.
² More than 17.8.
³ More than 20.6.

According to the above Experimental Example, it has been clarified that the present compounds are effective as synergists for cyclopropanecarboxylate type insecticides and carbamate type insecticides. Examples of the cyclopropanecarboxylate type insecticides and carbamate type insecticides which can be increased in insecticidal effects by addition of the present compounds are as shown below, but compounds in which the synergistic effects of the present compounds are displayed are not limited to these.

Natural pyrethrins; allethrin; phthalthrin; 3′,4′,5′,6′-tetrahydrophthalimidomethyl - 2,2,3,3 - tetramethylcyclopropane - 1 - carboxylate; N-(chrysanthemoxymethyl)-phthalimide; N - (chrysanthemoxymethyl) - monothiophthalimide; N - (chrysanthemoxymethyl)-dimethylmaleimide; 6-chrysanthemoxymethyltetralin; 3′-allyl-2′-methyl-4′-oxo-2′-cyclopentyl - 2,2,3,3 - tetramethylcyclopropane-1-carboxylate; 5-benzyl - 3 - furylmethylchrysanthemate [hereinafter referred to as "Chrysron" (registered trademark of Sumitomo Chemical Co., Ltd.)]; 5′-benzyl-3′-furylmethyl-2,2,3,3-tetramethylcyclopropane - 1 - carboxylate and other substituted furfuryl esters of cyclopropanecarboxylic acid; 5′-benzyl-2′-thenyl-2,2,3,3-tetramethylcyclopropane-1-carboxylate; 5-benzyl - 2 - thenylchrysanthemate; dimethrin; 3-phenoxybenzylchrysanthemate; 3′ - phenoxybenzyl-2,2,3,3-tetramethylcycloprane-1-carboxylate; 3-benzylbenzylchrysanthemate; 3′-benzylbenzyl-2,2,3,3-tetramethylcyclopropane-1-carboxylate and other substituted benzyl ester of cyclopropanecarboxylic acid; carbaryl; 3,4 - dimethyl-phenyl-N-methylcarbamate [hereinafter referred to as "Meobal" (registered trademark of Sumitomo Chemical Co., Ltd.)]; 3,5-dimethylphenyl-N-methylcarbamate (hereinafter referred to as Cosban); 2-sec-butylphenyl-N-mehylcarbamate (hereinafter referred to as Bassa).

Compositions comprising one or more insecticides of the cyclopropanecarboxylic ester type and the carbamate type, as the active ingredients, and, in addition, one or more diphenylethylene derivatives of the present invention in an amount of 0.5 to 50 times the weight of said active ingredients, are specifically effective in controlling sanitary pests such as house flies, mosquitoes, cockroaches; rice plant pests such as rice stem borers, planthoppers, leafhoppers; lepidopterous larvae, which are injurious to fruit-trees and vegetables, such as larvae of cabbage worms, army worms, diamond-back moths, cut worms, etc.; plant parasitic mites; pantry pests such as rice weevils, almond moths, etc. Furthermore, said compositions are also effective in controlling other agricultural and sanitary pests, forest pests, and pests for horticulture.

In preparing the insecticidal compositions according to the present invention, the active insecticides of the cyclopropanecarboxylic ester type or the carbamate type, and the novel synergists of diphenylmethane derivatives are directly formulated by use of usual adjuvants for insecticides into all forms, such as oil sprays, emulsifiable concentrates, wettable powders, dusts, granules, aerosols, mosquito coil, fumigants, dusts containing baits and other attractants, solid preparations, and any other form, although in some cases it is more convenient for formulation to use the active ingredients and synergists dissolved in advance in suitable solvents such as xylene, methylnaphthalene, acetone, trichloroethane, etc.

For special uses, the insecticidal activities of said compositions can be further enhanced by being incorporated simultaneously with piperonyl butoxide, sulfoxide, sufroxane, MGK-264 and other known synergists for pyrethroids, etc.

Multipurpose compositions can be formulated with said insecticidal compositions by the incorporation with other active ingredients such as organochlorine or organo-phosphorus, insecticides, fungicides, miticides, herbicides, fertilizers, and other agricultural chemicals.

The preparative method and the effectiveness of the present insecticidal compositions will be further illustrated in the following Examples 5 to 20, and Test Examples 1 to 10, these examples being, needless to say, not intended to limit the scope of the present invention.

In the examples, the numerals in the parentheses show the aforementioned numbers representing the present compounds, and all parts are by weight.

EXAMPLE 5

0.4 part of each of the present compounds (1), (2) and (3) was added to 0.08 part of Phthalthrin, and the mixture was dissolved in 2 parts of xylene. The solution was charged with deodorized kerosene to make the total amount 100 parts, whereby oil solutions of the individual compounds were obtained.

EXAMPLE 6

0.5 part of each of the present compounds (1) (2) and (4) was added to 0.1 part of allethrin, and the mixture was dissolved in 3 parts of xylene. The solution was charged with deodorized kerosene to make the total amount 100 parts, whereby oil solutions of the individual compounds were obtained.

EXAMPLE 7

A mixture comprising 0.035 part of Phthalthrin, 0.015 part of Chrysron and 0.2 part of the present compound (4) was dissolved in 2 parts of xylene, and the solution was charged with deodorized kerosene to make the total amount 100 parts, whereby an oil solution was obtained.

EXAMPLE 8

A mixture comprising 1.5 parts of pyrethrum extract (containing 20% of pyrethrin), 1.5 parts of the present compound (2), 0.5 part of piperonyl butoxide, 5.5 parts of xylene and 5 parts of deodorized kerosene was charged into an aerosol container. After attaching a valve portion to the container, 85 parts of a propellant (liquefied petroleum gas) was filled under pressure through said valve portion into the container, whereby an aerosol was obtained.

EXAMPLE 9

A mixture comprising 0.35 part of Phthalthrin, 0.05 part of Chrysron, 1.6 parts of the present compound (1), 7 parts of xylene and 6 parts of deodorized kerosene was charged into an aerosol container. After attaching a valve portion to the container, 85 parts of a propellant (same as mentioned above) was filled under pressure through said valve portion into the container, whereby an aerosol was obtained.

EXAMPLE 10

A mixture comprising 0.2 part of N-(chrysanthemoxymethyl)-dimethylmaleimide, 0.2 part of 3-phenoxybenzyl chrysanthemate, 1.6 parts of the present compound (1), 12 parts of deodorized kerosene and 1 part of Atmos 300 (registered trade name for an emulsifier produced by Atlas Chemical Co.) was emulsified with addition of 50 parts of pure water. Thereafter, the emulsion was charged into an aerosol container together with 35 parts of a 3:1 mixture of deodorized butane and deodorized propane, whereby a water-based aerosol was obtained.

EXAMPLE 11

A mixture comprising 0.3 part of Phthaltrin and 1.5 parts of the present compound (3) was dissolved in 20 parts of acetone. To this solution was added 98.2 parts of 300 mesh diatomaceous earth, and the mixture was throughly stirred in a mortar. Thereafter, the acetone was removed by vaporization to obtain a dust.

EXAMPLE 12

A mixture comprising 1 part of Meobal and 3 parts of the present compound (1) was dissolved in 20 parts of acetone. To this solution was added 96 parts of 200 mesh talc, and the mixture was thoroughly stirred in a mortar. Thereafter, the acetone was removed by vaporization to obtain a dust.

EXAMPLE 13

A mixture comprising 1 part of Bassa and 3 parts of the present compound (3) was dissolved in 20 parts of acetone. To this solution was added 96 parts of 200 mesh talc, and the mixture was thoroughly stirred in a mortar. Thereafter, the acetone was removed by vaporization to obtain a dust.

EXAMPLE 14

5 parts of Phthalthrin, 20 parts of the present compound (1), 15 parts of Sorpol SM-200 (registered trade name for an emulsifier produced by Toho Chemical Co.) and 60 parts of xylene were stirred, mixed and dissolved together to obtain an emulsifiable concentrate.

EXAMPLE 15

5 parts of Chrysron, 25 parts of the present compound (2), 15 parts of Sorpol SM-200 and 55 parts of xylene were stirred, mixed and dissolved together to obtain an emulsifiable concentrate.

EXAMPLE 16

15 parts of Phthalthrin, 5 parts of 3'-phenoxy-benzyl-2,2,3,3 - tetramethylcyclopropane - 1 - carboxylate, 30 parts of the present compound (1) and 5 parts of Sorpol SM-200 were thoroughly mixed together. The mixture was charged with 45 parts of 300 mesh talc and was thoroughly stirred in a mortar to obtain a wettable powder.

EXAMPLE 17

0.4 g. of allethrin and 1.2 g. of each of the present compounds (1) and (4) were dissolved in 20 ml. of methanol. This solution was homogeneously mixed with 98.4 g. of a mosquito coil carrier (a 3:5:1 mixture of Tabu powder, pyrethrum marc and wood powder). After removing the methanol by vaporization, the mixture was thorougly kneaded with 150 ml. of water and was then shaped and dried to obtain mosquito coils of the individual compounds.

EXAMPLE 18

A mixture comprising 0.2 g. of allethrin and 0.8 g. of the present compound (1) was dissolved in a suitable amount of chloroform. This solution was uniformly adsorbed on the surface of asbestos of 2.5 cm. x 1.5 cm. in area and 0.3 mm. in thickness, onto which was then applied asbestos same in size as above to obtain a fibrous insecticidal fumigant composition to be used on an electric heating plate.

The asbestos may be replaced by other fibrous carrier identical in effectiveness therewith such as a pulp sheet or the like.

EXAMPLE 19

5 parts of 6-chrysanthemoxymethyl tetraline, 15 parts of the present compound (2), 2 parts of O,O-dimethyl-O-(3-methyl-4-nitrophenyl)thiophosphate, 10 parts of Sorpol SM–200 and 68 parts of xylene were stirred, mixed and dissolved together to obtain an emulsifiable concentrate.

EXAMPLE 20

A mixture comprising 5 parts of Dimethrin, 15 parts of the present compound (1), 5 parts of Toyolignin CT (trade name for a product of Toyo Spinning Co.) and 75 parts of GSM clay (registered trade name for a clay produced by Zieklite Mining Co.) was thoroughly stirred in a mortar. The mixture was kneaded with 10% based on the weight of the mixture of water, was granulated by means of a granulator and was then dried in air to obtain a granule.

The insecticidal effects of the present compositions obtained in the above manner are shown below with reference to test examples.

Test Example 1

According to the Campbel's turn table method (Soap and Sanitary Chemicals, vol. 14, No. 6, page 119 (1938)), 5 ml. of each of the oil solutions obtained in Examples 5, 6 and 7 was sprayed, and housefly adults (about 100 flies per group) were exposed to the settling mist for 10 minutes. Thereafter, the flies were taken out and fed and were allowed to stand in a thermostat at 27° C., and the alive and dead thereof were observed after 24 hours to calculate the mortality.

The results were as shown in Table 1.

TABLE 1

| Example No. | Insecticide | Percent | Synergist | Percent | Mortality (percent) |
|---|---|---|---|---|---|
| Oil solution of Example 5 | Phthalthrin | 0.08 | Present compound (1) | 0.4 | 97 |
| Do | do | | Present compound (2) | 0.4 | 95 |
| Do | do | | Present compound (4) | 0.4 | 92 |
| Oil solution of Example 6 | Allethrin | 0.1 | Present compound (1) | 0.5 | 98 |
| Do | do | | Present compound (2) | 0.5 | 93 |
| Do | do | | Present compound (4) | 0.5 | 88 |
| Oil solution of Example 7 | Phthalthrin | 0.035 | Present compound (4) | 0.2 | 100 |
| | Chryston | 0.015 | | | |
| | Allethrin | 0.2 | | | 8 |

Test Example 2

Insecticidal effects on housefly adults of the aerosols obtained in Examples 8, 9 and 10 were tested according to the aerosol test method using Peet Grady's chamber [(6 ft.)$^3$] [the method disclosed in Soap and Chemical Specialties, Blue Book (1965)].

The results were as shown in Table 2.

TABLE 2

| Composition | Sprayed amount (g./1,000 ft.$^3$) | Knock down ratio (percent) | | | Mortality (percent) |
|---|---|---|---|---|---|
| | | 5 min. | 10 min. | 15 min. | |
| Aerosol of Example 8 | 3.2 | 38 | 74 | 92 | 84 |
| Aerosol of Example 9 | 2.9 | 41 | 77 | 95 | 92 |
| Water based aerosol of Example 10 | 3.1 | 42 | 81 | 97 | 94 |

Test Example 3

Each of the dusts obtained in examples 11 and 12 was uniformly sprayed in a proportion of 2 g./m.$^2$ onto the bottom of a Petri dish of 14 cm. in diameter, and the inner wall of the dish was coated with butter, leaving at the lower part an uncoated area of 1 cm. in width. Subsequently, German cockroach adults (10 cockroaches per group) were liberated in the dish and were contacted with the dust for 10 minutes. Thereafter, the cockroaches were transferred to another vessel and were fed, and, after 3 days, the alive and dead thereof were observed.

The results were as shown in Table 3.

TABLE 3

| Example No. | Insecticide | Percent | Synergist | Percent | Knock down ratio after 10 min. | Mortality (percent) |
|---|---|---|---|---|---|---|
| Dust of Ex. 11 | Phthalthrin | 0.3 | Present compound (3) | 1.5 | 100 | 100 |
| Dust of Ex. 12 | Meobal | 1.0 | Present compound (1) | 3.0 | 80 | 100 |

Test Example 4

About 50 housefly adults were liberated in a (70 cm.$^3$) glass chamber, and 0.7 ml. of an emulsion formed by diluting with water to 50 times each of the emulsifiable concentrates obtained in Examples 14 and 15 was sprayed thereto under a pressure of 20 lbs./in.$^2$ by use of a glass atomizer, whereby more than 80% of the houseflies could be knocked down within 10 minutes. Further, more than 80% of the knocked-down houseflies could be killed on the next day.

Test Example 5

About 50 adults of northern house mosquitoes were liberated in a (70 cm.$^3$) glass chamber. In the chamber was placed, after igniting on both ends, 1 g. of each of the mosquito coils obtained in Example 17, whereby the individual mosquito coils could knock down more than 80% of the mosquitoes within 20 minutes.

Test Example 6

About 50 northern house mosquito adults were liberated in a 70 cm.$^3$) glass chamber. In the chamber was heated and fumigated on an electric heating plate the fumigant composition obtained in Example 18, whereby more than 90% of the mosquitoes could be knocked down within 20 minutes.

Test Example 7

Each of the emulsifiable concentrates obtained in Examples 15 and 19 was diluted with water to 40,000 times, and 2 liters of the resulting emulsion was charged into a polystyrene-made case of 23 cm. x 30 cm. with a depth of 6 cm. Into this case were liberated about 100 full-grown larvae of northern house mosquitoes, whereby more than 90% of the larvae could be killed on the next day.

Test Example 8

10 liters of water was placed in a 15 liter-polyethylene bucket, and 0.5 g. of the granule obtained in Example 20 was charged into the water. After one day, about 100 full-grown larvae of northern house mosquitoes were liberated in the water, and the alive and dead thereof were observed, whereby more than 90% of the larvae could be killed within 24 hours.

Test Example 9

In a 1/50,000 Wagner pot were grown rice plants which had elapsed 45 days after sowing. Onto the rice plants was sprayed 10 ml./pot of each of an aqueous 200 times-diluted liquid of the emulsifiable concentrate obtained in Example 15 and an aqueous 500 times-diluted solution of the wettable powder obtained in Example 16. The pot was covered with a wire net and about 30 adults of green rice leafhoppers were liberated therein, whereby more than 90% of the insects could be killed on the next day.

Test Example 10

In a flower pot of 9 cm. in diameter were grown about 20 rice seedlings which had elapsed 20 days after sowing. Onto the rice seedlings was dusted for 4 minutes by use of a bell jar duster 300 mg./pot of each of the dusts obtained in Examples 11, 12 and 13. Thereafter, the pot was covered with a wire net, and about 20 adults of planthoppers (*Nilaparvata lugens* Stal) were liberated therein, whereby more than 90% of the planthoppers could be killed within 24 hours.

What we claim is:

1. A diphenylethylene compound represented by the formula

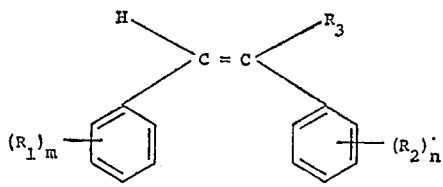

wherein $R_1$ and $R_2$ are respectively hydrogen, methyl, methoxy, methylene dioxy group bonded to 2 carbon atoms adjacent to each other on the benzene ring, chlorine or bromine, $R_3$ is $-COOCH_2CH\equiv CH$ or $$-CH_2OCH_2C\equiv CH$$

and $m$ and $n$ are an integer of 1 to 5, and when $m$ and/or $n$ are an integer of 2 or more, the $R_1$'s and/or the $R_2$'s may be the same or different.

2. A diphenylethylene represented by the formula,

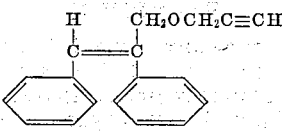

3. A diphenylethylene represented by the formula,

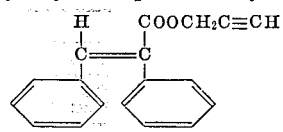

4. A diphenylethylene represented by the formula,

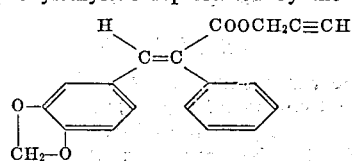

5. A diphenylethylene represented by the formula,

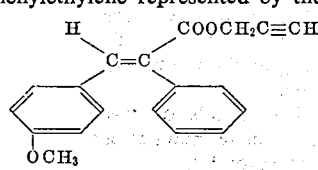

References Cited

Valente et al.: J. Org. Chem. 31(8), 2509–12 (1966).
Morrison et al.: "Organic Chemistry," 2nd ed., Allyn and Bacon, Inc., Boston, Mass. (1966), pp. 562–3 and 671–3.

HENRY R. JILES, Primary Examiner

G. T. TODD, Assistant Examiner

U.S. Cl. X.R.

260—469, 473 R, 611 A; 424—282, 305, 306, 339